US011496947B2

(12) United States Patent
Yin et al.

(10) Patent No.: US 11,496,947 B2
(45) Date of Patent: Nov. 8, 2022

(54) METHOD FOR ACCESSING LOCAL NETWORK AND DEVICE

(71) Applicant: HUAWEI TECHNOLOGIES CO., LTD., Guangdong (CN)

(72) Inventors: Yu Yin, Shanghai (CN); Caixia Qi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 16/884,507

(22) Filed: May 27, 2020

(65) Prior Publication Data

US 2020/0288378 A1 Sep. 10, 2020

Related U.S. Application Data

(63) Continuation of application No. PCT/CN2018/114805, filed on Nov. 9, 2018.

(30) Foreign Application Priority Data

Nov. 28, 2017 (CN) .......................... 201711216504.7

(51) Int. Cl.
*H04W 48/10* (2009.01)
*H04W 48/18* (2009.01)

(52) U.S. Cl.
CPC ............ *H04W 48/10* (2013.01); *H04W 48/18* (2013.01)

(58) Field of Classification Search
CPC ..... H04W 48/10; H04W 48/18; H04W 36/14; H04W 48/14; H04W 4/24; H04W 48/16;
(Continued)

(56) References Cited

U.S. PATENT DOCUMENTS 7,096,030 B2 * 8/2006 Huomo ................. H04W 4/029
455/456.3
2003/0118015 A1 6/2003 Gunnarsson et al.
(Continued)

FOREIGN PATENT DOCUMENTS

CN 101272274 A 9/2008
CN 101453722 A 6/2009
(Continued)

OTHER PUBLICATIONS

Search Report issued in CN Application No. 2017112165047 dated Jan. 14, 2021, total 2 pages.
(Continued)

*Primary Examiner* — Brandon J Miller

(57) ABSTRACT

A method for accessing a local network includes: subscribing, by a network device, to service area change information of user equipment, where the service area change information of the user equipment indicates that the user equipment enters or leaves a service area of the local network; receiving, by the network device, the service area change information of the user equipment; and performing, based on the received service area change information, policy control for the user equipment accessing or leaving the local network. In this way, access to the local network is accurately controlled, and is not affected by wireless network planning and adjustment, which greatly enhances user experience in use of the local network.

22 Claims, 10 Drawing Sheets

(58) Field of Classification Search
CPC ..... H04L 12/14; H04L 12/1407; H04L 12/28; H04L 29/08; H04M 15/00; H04M 15/64; H04M 15/66
See application file for complete search history.

(56) References Cited

U.S. PATENT DOCUMENTS

| | | |
|---|---|---|
| 2007/0224988 A1 | 9/2007 | Shaheen |
| 2009/0254494 A1 | 10/2009 | Li et al. |
| 2010/0195621 A1 | 8/2010 | Kekki et al. |
| 2010/0287121 A1 | 11/2010 | Li et al. |
| 2013/0021978 A1* | 1/2013 | Tamura ............. H04W 12/0431 370/328 |
| 2017/0064691 A1 | 3/2017 | Kubota et al. |
| 2019/0199860 A1* | 6/2019 | Vikberg ................. H04W 4/50 |

FOREIGN PATENT DOCUMENTS

| | | |
|---|---|---|
| CN | 102026400 A | 4/2011 |
| CN | 102056141 A | 5/2011 |
| CN | 102905218 A | 1/2013 |
| CN | 104427476 A | 3/2015 |
| CN | 105979587 A | 9/2016 |
| EP | 1166571 B1 | 10/2005 |
| EP | 2090133 A2 | 8/2009 |
| EP | 2117252 B1 | 2/2014 |
| EP | 2388952 B1 | 9/2014 |
| EP | 2983411 A1 | 2/2016 |
| EP | 3001733 A4 | 6/2016 |
| EP | 3120620 B1 | 12/2018 |
| JP | 2014506747 A | 3/2014 |
| JP | 2014519781 A | 8/2014 |
| JP | 2015111831 A | 6/2015 |
| WO | 2008081816 A1 | 7/2008 |
| WO | 2015109475 A1 | 7/2015 |
| WO | 2017022039 A1 | 2/2017 |

OTHER PUBLICATIONS

Office Action issued in CN Application No. 201711216504.7 dated Jan. 22, 2021, total 6 pages.
Extended European Search Report issued in EP Application No. 18883655.5 dated Dec. 7, 2020, total 13 pages.
Office Action dated Jul. 20, 2021 issued in Japanese Application No. 2020-545842 (4 pages) and Translation (5 pages).
Gao Yu-chen,"Home Node User's Mobility Management",Wireless Communication Technology,2009,with an English abstract,total 5 pages.
Notice of Allowance dated Oct. 11, 2021 issued in Chinese Application No. 201711216504.7 (4 pages).
Office Action dated Mar. 22, 2022 issued for Japanese Application No. 2020-545842 (5 pages) and translation (5 pages).

* cited by examiner

METHOD FOR ACCESSING LOCAL NETWORK AND DEVICE

CROSS-REFERENCE TO RELATED APPLICATIONS

This application is a continuation of International Application No. PCT/CN2018/114805, filed on Nov. 9, 2018, which claims priority to Chinese Patent Application No. 201711216504.7, filed on Nov. 28, 2017. The disclosures of the aforementioned applications are hereby incorporated by reference in their entireties.

TECHNICAL FIELD

Example embodiments of the present invention relate to the communications field, and in particular, to a method for accessing a local network and a device.

BACKGROUND

A local network is a network that covers an enterprise campus, a public service place, or a hotspot area, for example, a network that covers a place such as an enterprise office, a large shopping mall, or a library. User equipment may access an intranet, such as a virtual private network (VPN) of an enterprise network/campus network/library network, through the local network. When entering a coverage area of the local network, for example, entering the enterprise campus, the user equipment may access the intranet.

In the prior art, a tracking area identity (TAI) is used to identify a corresponding location area covered by the local network. During mobile network planning, a tracking area is divided mainly based on factors such as wireless coverage. For example, user density in urban and suburban areas, geographical continuity, and mountain or river boundaries are considered. It is difficult to ensure a same coverage area of the tracking area as that of the local network. Due to frequently adjusted and changed wireless coverage, a corresponding location area of the local network varies accordingly. Therefore, a control policy, on a network side, for the local network needs to be changed accordingly, resulting in complex network system management. In addition, user experience in use of the local network in reduced.

SUMMARY

To eliminate a prior-art defect, embodiments of the present invention provide a method for accessing a local network and a device, so as to accurately identify a coverage area of the local network, perform corresponding policy control in the local network, and improve user experience in use of the local network.

According to a first aspect, an embodiment of the present invention provides a method for accessing a local network, and the method includes: receiving, by user equipment, a system message broadcast by a base station; determining, based on the system message, that a service area is changed; and notifying a network device that the service area is changed, so that the network device performs policy control for accessing or leaving the local network corresponding to the service area.

With the foregoing method, access to the local network is accurately controlled, and is not affected by wireless network planning and adjustment, which greatly enhances user experience in use of the local network.

In a possible implementation, the determining, based on the system message, that a service area is changed includes: determining, by the user equipment based on that the received system message includes an identifier of the service area, that the user equipment enters the service area; and the notifying a network device that the service area is changed includes: sending, by the user equipment, a service area entering notification message to the network device, where the service area entering notification message includes the identifier of the service area that the user equipment enters. Therefore, system flexibility is further improved.

In another possible implementation, the determining, based on the system message, that a service area is changed includes: determining, by the user equipment based on that the received system message does not include an identifier of the service area, that the user equipment leaves the service area; and the notifying a network device that the service area is changed includes: sending, by the user equipment, a service area leaving notification message to the network device, where the service area leaving notification message includes the identifier of the service area that the user equipment leaves. Therefore, system flexibility is further improved.

In another possible implementation, before the receiving a system message broadcast by a base station, the method further includes: receiving, by the user equipment, a list of identifiers of service areas that is sent by the network device, where the list of identifiers of service areas includes one or more identifiers of the service area and indicates the user equipment to send a notification message to the network device after the user equipment enters or leaves the service area. Therefore, system flexibility is further improved.

In another possible implementation, before the receiving a system message broadcast by a base station, the method further includes: receiving, by the user equipment, a service area leaving reporting indication message sent by the network device, where the service area leaving reporting indication message includes the identifier of the service area and indicates the user equipment to send the notification message to the network device after the user equipment leaves the service area. Therefore, system flexibility is further improved.

In another possible implementation, the identifier of the service area corresponds to a service area of the local network, and the service area includes one or more location areas. Therefore, system flexibility is further improved.

According to a second aspect, an embodiment of the present invention provides a method for accessing a local network, and the method includes: subscribing, by a network device, to service area change information of user equipment, where the service area change information of the user equipment indicates that the user equipment enters or leaves a service area of the local network; receiving the service area change information of the user equipment; and performing, based on the received service area change information, policy control for a case in which the user equipment accesses or leaves the local network.

With the foregoing method, access to the local network is accurately controlled, and is not affected by wireless network planning and adjustment, which greatly enhances user experience in use of the local network.

In a possible implementation, the subscribing, by a network device, to service area change information of user equipment specifically includes: sending, by the network device, a list of identifiers of service areas to the user equipment, where the list of identifiers of service areas includes identifiers of one or more service areas and indicates the user equipment to send a notification message to the network device after the user equipment enters or leaves the service area, where the list of service areas is at least one of the following: a list of service areas allowing access of the user equipment that is included in subscription data of the user equipment, a list of service areas allowing access of the user equipment that is included in policy data, or a list of service areas allowing access of the user equipment that is included in local configuration of the network device. Therefore, system flexibility is further improved.

In another possible implementation, the subscribing, by a network device, to service area change information of user equipment specifically includes: sending, by the network device, a service area subscription message to a base station, where the service area subscription message includes a list of identifiers of service areas, where the list of identifiers of service areas includes identifiers of one or more service areas and indicates the base station to send a service area reporting message to the network device after the user equipment enters the service area, where the list of service areas is a list of local networks allowing access of the user equipment that is locally configured by the network device. Therefore, system flexibility is further improved.

In another possible implementation, the service area subscription message further includes a user equipment identity, and the user equipment identity indicates the base station to send the service area reporting message to the network device after the user equipment enters the service area; and the list of service areas is at least one of the following: a list of service areas allowing access of the user equipment that is included in subscription data of the user equipment, a list of service areas allowing access of the user equipment that is included in policy data, or a list of service areas allowing access of the user equipment that is included in local configuration of the network device. Therefore, system flexibility is further improved.

In another possible implementation, the method further includes: receiving, by the network device, the service area reporting message sent by the base station, where the message includes an identifier of the service area that the user equipment enters; and sending, by the network device, a service area leaving reporting indication message to the user equipment, where the service area leaving reporting indication message includes the identifier of the service area and indicates the user equipment to send a notification message to the network device after the user equipment leaves the service area. Therefore, system flexibility is further improved.

In another possible implementation, the receiving the service area change information of the user equipment is receiving a notification message indicating that the user equipment enters the service area, and the service area entering notification message includes the identifier of the service area; and the performing policy control for a case in which the user equipment accesses the local network includes: establishing a session between the user equipment and a local gateway corresponding to the identifier of the service area. Therefore, system flexibility is further improved.

In another possible implementation, the receiving the service area change information of the user equipment is receiving a notification message indicating that the user equipment enters the service area, and the service area entering notification message includes the identifier of the service area; and the performing policy control for a case in which the user equipment accesses the local network includes: establishing a session from the user equipment through a traffic distribution device to a local gateway corresponding to the identifier of the service area, and establishing a session from the user equipment through the traffic distribution device to a public gateway. Therefore, system flexibility is further improved.

In another possible implementation, the receiving the service area change information of the user equipment is receiving a notification message indicating that the user equipment leaves the service area; and the performing policy control for a case in which the user equipment leaves the local network includes: deleting, by the network device, the session between the user equipment and the local gateway. Therefore, system flexibility is further improved.

In another possible implementation, the identifier of the service area corresponds to a service area of the local network, and the service area includes one or more location areas. Therefore, system flexibility is further improved.

According to a third aspect, an embodiment of the present invention provides a service area notification method, and the method includes: broadcasting, by a base station, a system message to user equipment, where the system message includes an identifier of a service area, to notify the user equipment of a service area in which the user equipment is currently located; where the identifier of the service area corresponds to a service area of a local network, and the service area includes one or more location areas.

With the foregoing method, access to the local network is accurately controlled, and is not affected by wireless network planning and adjustment, which greatly enhances user experience in use of the local network.

According to a fourth aspect, an embodiment of the present invention provides a service area notification method, and the method includes: receiving, by a base station, a service area subscription message sent by a network device, where the service area subscription message includes a list of identifiers of service areas, where the list of identifiers of service areas includes identifiers of one or more service areas and indicates the base station to send a service area reporting message to the network device after user equipment enters the service area; and sending, by the base station, the service area reporting message to the network device after the user equipment enters the service area.

With the foregoing method, access to the local network is accurately controlled, and is not affected by wireless network planning and adjustment, which greatly enhances user experience in use of the local network.

According to a fifth aspect, an embodiment of the present invention provides user equipment, where the user equipment has a function of implementing an action of the user equipment in the foregoing methods. The function may be implemented by hardware, or may be implemented by hardware by executing corresponding software. The hardware or the software includes one or more modules corresponding to the foregoing function, for example, includes a receive unit, a determining unit, and a notification unit.

In a possible implementation, a structure of the user equipment includes a processor and a memory. The memory is configured to store application program code supporting the user equipment in performing the foregoing methods, and the processor is configured to execute a program stored in the memory. The user equipment may further include a communications interface, configured to communicate with another device.

According to a sixth aspect, an embodiment of the present invention provides a network device, where the network device has a function of implementing an action of the network device in the foregoing methods. The function may be implemented by hardware, or may be implemented by hardware by executing corresponding software. The hardware or the software includes one or more modules corresponding to the foregoing function, for example, includes a subscription unit, a receive unit, and a control unit.

In a possible implementation, a structure of the network device includes a processor and a memory. The memory is configured to store program code supporting execution of the foregoing methods, and the processor is configured to execute a program stored in the memory. The network device may further include a communications interface, configured to communicate with another device.

According to a seventh aspect, an embodiment of the present invention provides a base station, where the base station has a function of implementing an action of the base station in the foregoing methods. The function may be implemented by hardware, or may be implemented by hardware by executing corresponding software. The hardware or the software includes one or more modules corresponding to the foregoing function, for example, includes a system message generation unit and a system message broadcast unit, or a receive unit and a reporting unit.

In a possible implementation, a structure of the base station includes a processor and a memory. The memory is configured to store program code supporting execution of the foregoing methods, and the processor is configured to execute a program stored in the memory. The base station may further include a communications interface, configured to communicate with another device.

According to an eighth aspect, an embodiment of the present invention provides a computer storage medium, configured to store a computer software instruction used by the foregoing network device, base station or user equipment. The computer software instruction includes a program designed to perform the foregoing aspects.

In the foregoing technical solutions for accessing the local network that are provided in the embodiments of the present invention, policy control is performed for access of a user in the service area, so that access to the local network is accurately controlled and is not affected by wireless network planning and adjustment, which greatly enhances user experience in use of the local network.

DESCRIPTION OF EMBODIMENTS

To make the objectives, technical solutions, and advantages of example embodiments of the present invention clearer, the following further describes the embodiments of the present invention in detail with reference to the accompanying drawings. Before the embodiments of the present invention are described in detail, an application scenario of the embodiments of the present invention is first described.

The method for accessing a local network provided in the embodiments of the present invention is applied to a mobile communications network system. An example of an application scenario is as follows: An employee of an enterprise subscribes to a local network of the enterprise. When the employee enters a specific area such as headquarters, a factory, or an R&D center of the enterprise, user equipment of the employee may directly access the local network of the enterprise by using a wireless communications network, to obtain internal information of the enterprise. An example of another application scenario is as follows: For some public service places such as a shopping mall and a library, user equipment of the public can access local networks of the shopping mall and the library in a service area without subscribing to the local networks of these public service places, to obtain information about commodities and books. These areas that are covered by the wireless communications network and in which the local network of the enterprise, the shopping mall or the library can be accessed are service areas of the local network.

Figure 1:
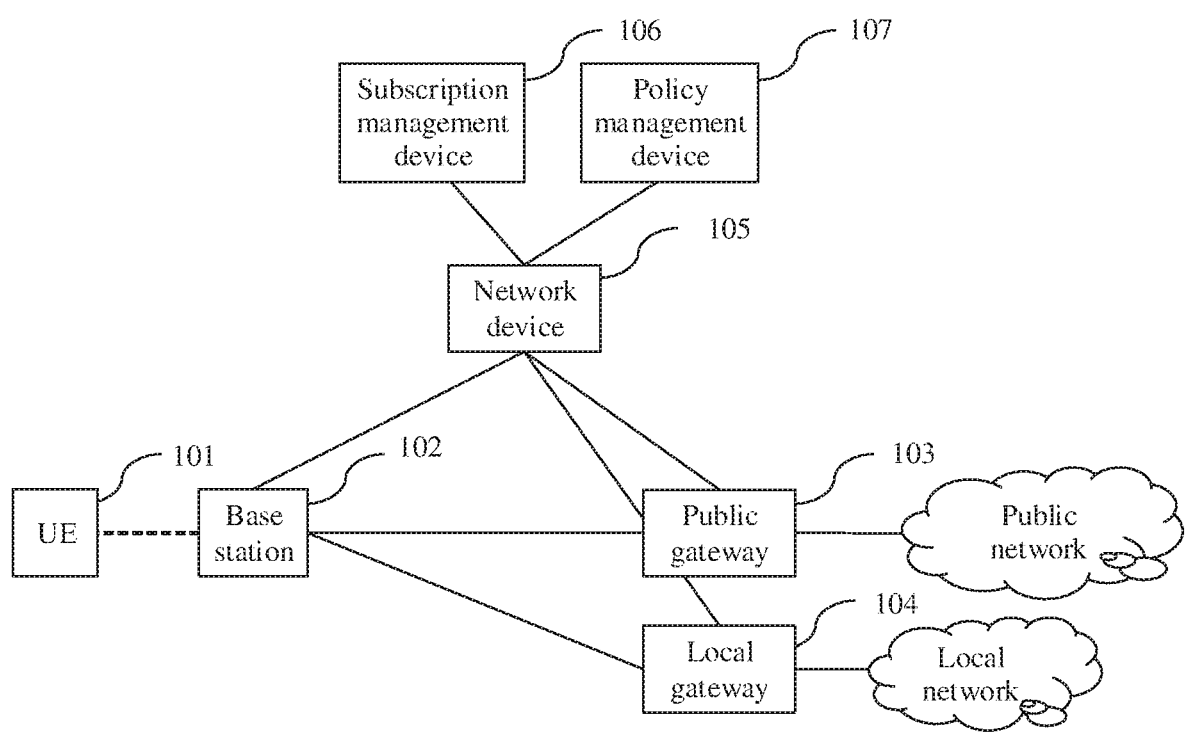
FIG. 1 is a schematic diagram of an architecture of a system for accessing a local network according to an embodiment of the present invention.

FIG. 1 is a system of a local network according to an embodiment of the present invention. With the system, user equipment may access the local network. FIG. 1 includes user equipment (UE) 101, a base station 102, a public gateway 103, a local gateway 104, a network device 105, a subscription management device 106, and a policy management device 107.

The user equipment 101 may be a mobile phone or another mobile device, and is connected to a public network through a wireless communications network. After moving to a service area, the user equipment may access the local network. For user equipment that subscribes to the local network, the user equipment receives service area information, sent by the network device, of the subscribed local network.

The base station 102 is configured to connect the user equipment to the wireless communications network. A base station in the service area may add an identifier of a current service area to a broadcast message, to notify user equipment in a coverage area of the base station.

The public gateway 103 is configured to connect the user equipment to the public network, for example, the internet.

The local gateway 104 is configured to connect the user equipment to the local network, for example, an internal network VPN of an enterprise.

The network device 105 is configured to manage device registration, security authentication, mobility management, location management, and the like for the user equipment. For example, the network device 105 may be a mobility management entity MME in a 4G core network.

The subscription management device 106 is configured to manage subscription data and functions, such as authentication and authorization, of the user equipment. For a user that subscribes to the local network, a subscription device stores information about the local network subscribed by the user. For example, an employee of an enterprise A subscribes to a local network of the enterprise, and the local network of the enterprise A includes three different service areas in two cities. In this case, an example of user data stored by the subscription management device is as follows:

| User equipment identity | Enterprise identifier | Service area identifier |
| --- | --- | --- |
| 1390000001 | E0001 | 0102, 0106, and 0315 |
| 1390000023 | E0003 | 0335 and 0403 |

User equipment 1390000001 subscribes to a local network of an enterprise E0001, and the local network has three service areas 0102, 0106, and 0315.

The identifier of the service area corresponds to a local network and a coverage area included in the local network. The coverage area includes one or more location areas, and the location area may include wireless coverage areas such as a plurality of cells/tracking areas. Different location areas of a same local network may correspond to different identifiers of service areas, as shown in the foregoing table. The local network of the enterprise E0001 covers two cities: a city A and a city B. Some location areas in the city A correspond to the service area identifier 0102, a remaining location area in the city A corresponds to the service area identifier 0106, and a location area in the city B corresponds to the service area identifier 0315. Alternatively, a same identifier of a service area may be used in different location areas of a same local network. For example, the enterprise identifier E0001 may be used as the identifier of the service area, and location areas covered by the local network all correspond to the same identifier of the service area.

The policy management device 107 is configured to perform policy control on charging, quality of service (QoS), and the like of the user equipment. The policy management device may obtain policy data of the user equipment from a database, where the policy data may include information about a local network of the user equipment. For details, refer to an example of user data stored by the subscription management device.

Figure 2:
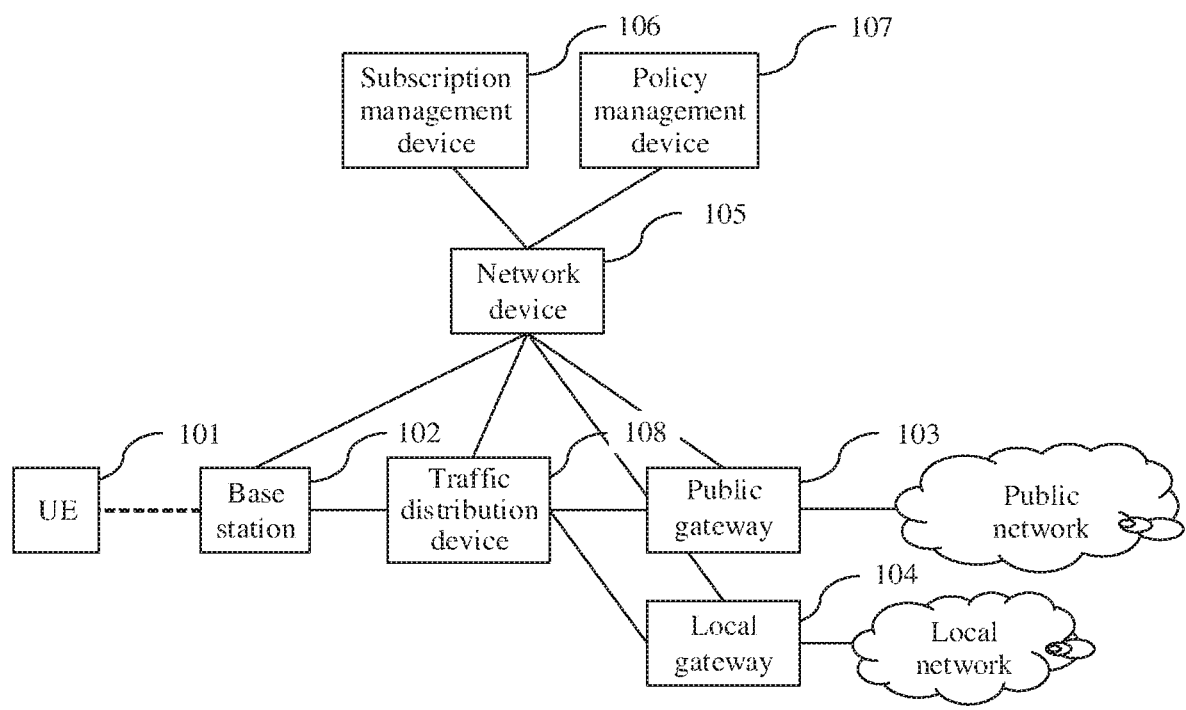
FIG. 2 is a schematic diagram of an architecture of another system for accessing a local network according to an embodiment of the present invention.

In some scenarios, for a same session, the user equipment needs to access both a local network and a public network. Therefore, a traffic distribution device may be deployed in the system. As shown in FIG. 2, a traffic distribution device 108 is configured to distribute a service data packet of the UE to the public gateway 103 or the local gateway 104.

The system architectures in FIG. 1 and FIG. 2 may correspond to a plurality of networks such as a third generation (3G) mobile communications network, a fourth generation (4G) mobile communications network, and a next generation (5G) mobile communications network. The network device may be the mobility management entity (MME), an access and mobility function (AMF), a session management function (SMF), or the like. The public gateway may be a serving gateway (SGW), a packet data network-gateway (PDN-GW), a user plane (UP) function network element, or the like. The subscription management device may be a home subscriber server (HSS) or a unified data management (UDM) function. The policy management device may be a policy control function (PCF) or a policy and charging rules function (PCRF).

Applied to the systems shown in FIG. 1 and FIG. 2, a method for connecting user equipment to a local network is provided in an embodiment of the present invention. In an implementation, for a scenario in which an employee of an enterprise subscribes to a local network of the enterprise, the user equipment first obtains a list of identifiers of service areas in which the local network can be accessed, so that when moving to the service area, the user equipment determines, based on a broadcast message received from a base station, that the user equipment enters the service area and accesses the local network.

Figure 3:
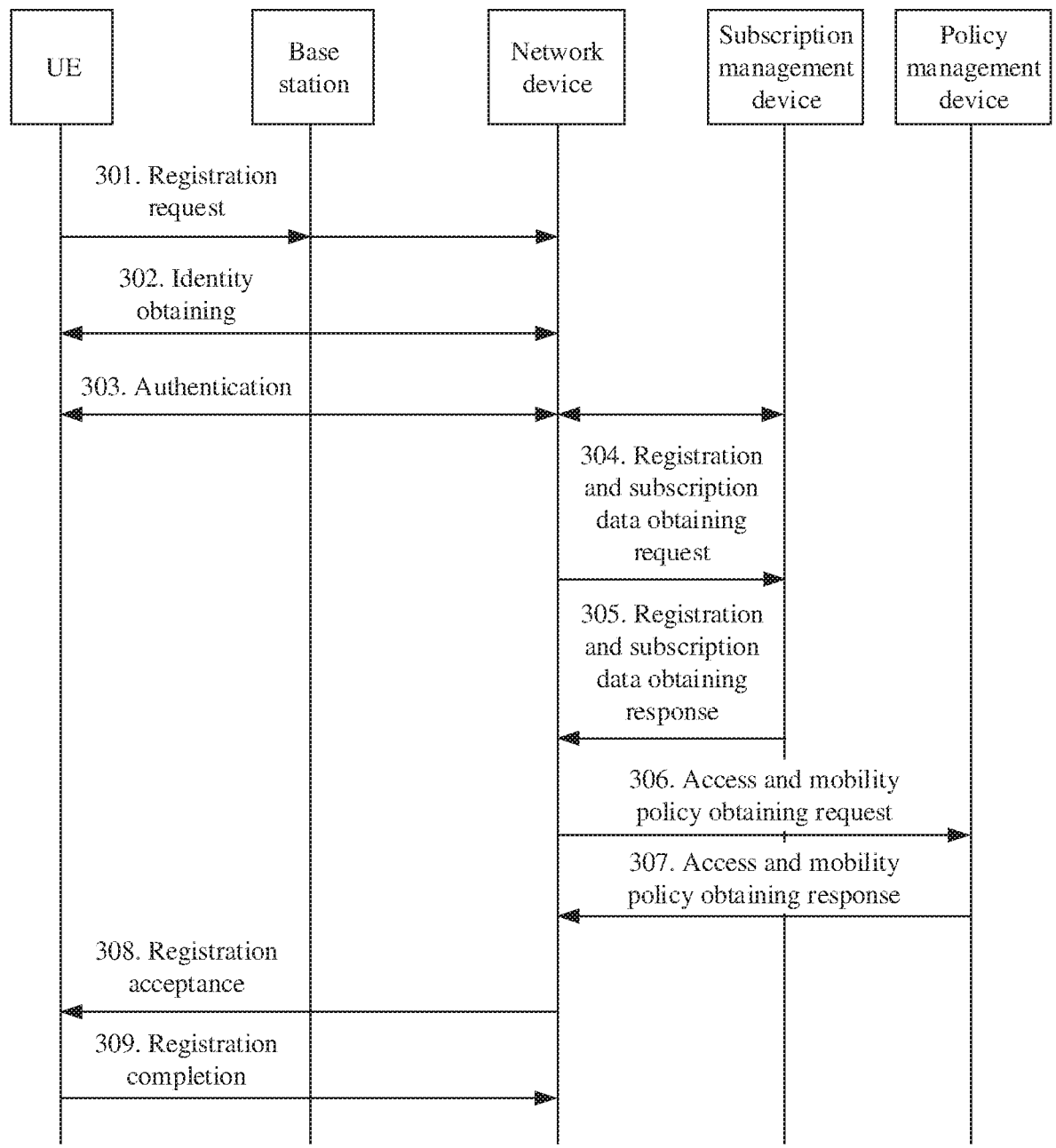
FIG. 3 is a schematic flowchart of a user equipment registration process according to an embodiment of the present invention.

A network device may deliver the list of identifiers of service areas in a plurality of procedures such as user equipment registration, attachment, a location area update, or a user equipment configuration update. The list is generated and stored in a subscription management device of an operator when the user equipment subscribes to the operator and a "local network access" service is enabled. FIG. 3 is a method for obtaining a list of identifiers of service areas in a user equipment registration procedure, and the method specifically includes the following steps:

301: User equipment sends a registration request message to a base station, and the base station forwards the registration request message to a network device. Generally, a registration procedure may be triggered by an operation such as power-on of the user equipment.

302: After receiving the registration request message, the network device obtains a user equipment identity from the user equipment if the registration request message does not include the user equipment identity. The user equipment identity may be an international mobile subscriber identity (IMSI), a network access identifier (NAI), or the like.

303: The network device authenticates the user equipment based on the user equipment identity, and checks validity of the user equipment.

304: After the authentication succeeds, the network device registers with the subscription management device and requests to obtain subscription data of the user equipment, where the request carries the user equipment identity.

305: The subscription management device returns a response message to the network device, where the response message includes the subscription data of the user equipment, and the subscription data includes a list of identifiers of service areas that the user equipment subscribes to, for example, includes data in the following table:

| User equipment identity | Service area identifier |
| --- | --- |
| 1390000001 | 0102, 0106, and 0315 |

306: The network device sends a policy obtaining request message to a policy management device, where the message is used to obtain policy data of the user equipment.

307: The policy management device returns a policy obtaining response message, where the message includes the policy data of the user equipment, and the policy data includes a list of identifiers of service areas allowing access of the user equipment.

For example, the policy data includes the following data:

| User equipment identity | Service area identifier |
| --- | --- |
| 1390000001 | 0102, 0106, 0315, and 0402 |

308: The network device sends a registration accept message to the user equipment, where the message includes the list of identifiers of service areas allowing access of the user equipment. For example, the message received by the user equipment includes three service area identifiers, namely, 0102, 0106, and 0315.

309: The user equipment returns a registration complete message.

It should be noted that in a 5G network, a service-based architecture is used, and a client-server communication mode is used for a signaling procedure. Correspondingly, the foregoing procedure is modified as follows:

Step 303a: The network device authenticates the user equipment by using a service provided by a subscription management device.

Step 304a: The network device registers user equipment information with the subscription management device by using a Nudm_UECM_Registration operation, obtains subscription data of the user equipment by using a Nudm_SDM_Get operation, and subscribes to a change of the user equipment information by using a Nudm_SDM_Subscribe operation.

Step 305a: The subscription management device returns a Nudm_UECM_Registration operation response, a Nudm_SDM_Get operation response, and a Nudm_SDM_Subscribe operation response.

Step 306a: The network device obtains policy data of the user equipment from a policy management device by using an Npcf_AMPolicyControl_Get operation.

Step 307a: The policy management device returns an Npcf_AMPolicyControl_Get operation response.

In the foregoing procedure, the network device sends the list of identifiers of service areas to the user equipment by using the registration accept message. Actually, the list of identifiers of service areas may also be carried in another message such as an attach message, a location area update message, or a user equipment configuration update message.

Alternatively, the list of identifiers of service areas allowing access of the user equipment may be locally configured by the network device. When the list of identifiers of service areas that is in the subscription data, the list of identifiers of service areas that is in the policy data, and the list of identifiers of service areas that is locally configured by the network device all exist, the network device may determine, based on an operator policy, the list of identifiers of service areas allowing access of the user equipment. For example, an intersection set of the list of identifiers of service areas that is in the subscription data, the list of identifiers of service areas that is in the policy data, and the list of identifiers of service areas that is locally configured by the network device is used as the list of identifiers of service areas allowing access of the user equipment. For another example, the list of identifiers of service areas that is locally configured by the network device takes priority.

It should be noted that the subscription data on the subscription management device, the policy data on the policy management device, and local configuration data on the network device may all include the list of identifiers of service areas of the user equipment. In specific implementation, one or more of the methods may be used by the operator, so that the user equipment subscribes to the list of identifiers of service areas or the list of identifiers of service areas is configured for the user equipment. Generally, the subscription data on the subscription management device is static data and is seldom changed. By contrast, the policy data on the policy management device is relatively dynamic and can be added, updated, or deleted. Local configuration on the network device can be used to strengthen management and control of a roaming subscriber.

For example, the method in which the subscription data on the subscription management device is used. When an employee of an enterprise A subscribes to a local network of the enterprise A during user equipment registration, the subscription management device sends a list of identifiers of service areas of the enterprise A to the network device when the subscription data is obtained.

Alternatively, the user equipment may directly obtain the list of identifiers of service areas by using an application server. For example, after accessing a public network internet by using the prior art, the user equipment accesses the application server by using an application client on the UE. The application server may be an application server of an operator or an application server of an enterprise. After authentication, the application server may send the list of identifiers of service areas to the UE. For example, an employee of an enterprise A enters information such as an employee ID and a password on an app of the enterprise A. After verifying that the information about the employee is correct, an application server of the enterprise A sends a list of identifiers of service areas corresponding to a network of the enterprise A to the employee.

Figure 4:
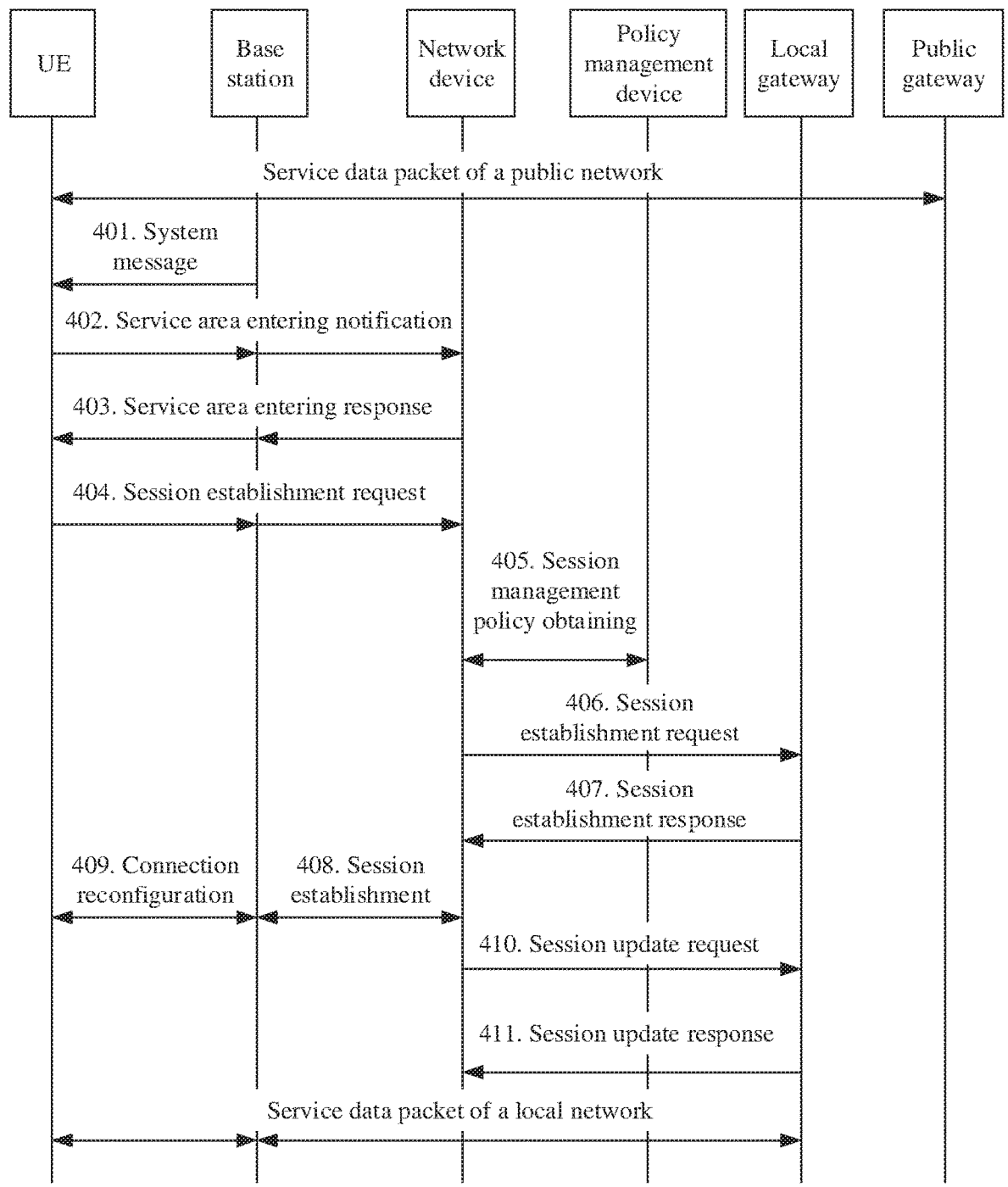
FIG. 4 is a schematic flowchart for a case in which user equipment accesses a local network according to an embodiment of the present invention.

After obtaining the list of identifiers of service areas, the user equipment may access the local network if the user equipment moves to the service area. FIG. 4 is a schematic flowchart for a case in which user equipment accesses a local network, which includes the following steps:

401: When moving to a service area, the user equipment receives a system message broadcast by a base station in the service area, where the system message includes a current cell identity and an identifier of the service area. For example, the system message includes data in the following table:

| Cell identity | Service area identifier |
| --- | --- |
| 0010022 | 0106 |

After receiving the system message, the user equipment determines that the service area identifier "0106" corresponding to the cell that the user equipment currently enters is included in a list of identifiers of service areas that is delivered by a network device, and then initiates a procedure to notify the network device.

It should be noted that the user equipment is previously not in the service area, and the user equipment initiates the procedure to notify the network device when moving and entering the service area. To be specific, the system message that is broadcast by the base station and previously received by the user equipment in another cell does not include any identifier of a service area, or the system message includes an identifier of a service area but does not include the identifier of the foregoing service area. When a cell within a coverage area of the base station is within a coverage area of the local network, the broadcast system message may include the identifier that is of the service area and that corresponds to a cell identity. If the cell is not within the coverage area of the local network, the broadcast system message includes the cell identity but does not include the identifier of the service area.

402: The user equipment sends a service area entering notification message to the network device, and the base station forwards the message, where the message includes the identifier of the service area that the user equipment currently enters.

403: After receiving the service area entering notification message sent by the user equipment, the network device checks, based on the identifier of the service area in the message, whether the user equipment is allowed to access the service area, and if the identifier of the service area is included in the list of identifiers of service areas that is delivered by the network device to the user equipment, the user equipment is allowed to access the service area.

After checking that the user equipment is allowed to access the service area, the network device sends a service area entering response message to the user equipment, where the message carries information about the local network corresponding to the service area that the user equipment enters, and the information about the local network includes a name of the local network, a service continuity mode, or the like. The information about the local network may be configured on the network device, or may be obtained by the network device from another node such as a subscription management device, a policy management device, or an operation and maintenance (O&M) center.

The service area entering notification message and the service area entering response message are merely examples, and specific names for the messages are not limited in this embodiment. Instead of a dedicated message, alternatively, the network device may be notified by using a message shared with another function, for example, by using a message to which a service area entering indication is added.

404: The user equipment sends a session establishment request message to the network device, to request to establish a session to the local network. The message carries the information about the local network that is delivered by the network device.

405: After receiving the message, the network device requests to obtain a session management policy related to the session from the policy management device, for example, to obtain a charging or QoS policy corresponding to a session established by the user equipment.

406: The network device sends a session establishment request to a local gateway, to establish a session between the user equipment and the local gateway.

407: The local gateway returns a session establishment response message, indicating that the session is successfully established.

In step 406 or 407, the network device may specify, for the local gateway, service data packet forwarding information related to the session, where the service data packet forwarding information includes information such as an IP address of the local gateway and a tunnel endpoint identifier of the local gateway. Alternatively, the local gateway may allocate service data packet forwarding information related to the session.

408: The network device requests the base station to establish the session of the user equipment, sends the service data packet forwarding information of the local gateway to the base station, and adds, to a message sent to the base station, a session establishment response message that is sent to the user equipment. The base station allocates service data packet forwarding information of the base station in this interaction, where the service data packet forwarding information includes information such as an IP address of the local gateway and a tunnel endpoint identifier of the local gateway.

409: The base station performs wireless connection reconfiguration with the user equipment, establishes a radio bearer for forwarding a service data packet, and forwards, to the user equipment, the session establishment response message that is sent by the network device to the user equipment.

410: The network device sends a session update request message to the local gateway, where the service data packet forwarding information of the base station is forwarded to the local gateway by using the message.

411: The local gateway returns a session update response message.

After the foregoing procedure is completed, a channel used to forward a service data packet of the local network is established between the user equipment and the local gateway, and the user equipment can access the local network.

It should be noted that in a 5G network, a service-based architecture procedure is used, and a client-server communication mode is used for a signaling procedure. The foregoing procedure is modified as follows:

Step 405a: The network device obtains policy data of the user equipment from the policy management device by using an Npcf_SMPolicyControl_Get operation. The policy management device returns an Npcf_SMPolicyControl_Get operation response.

Figure 5:
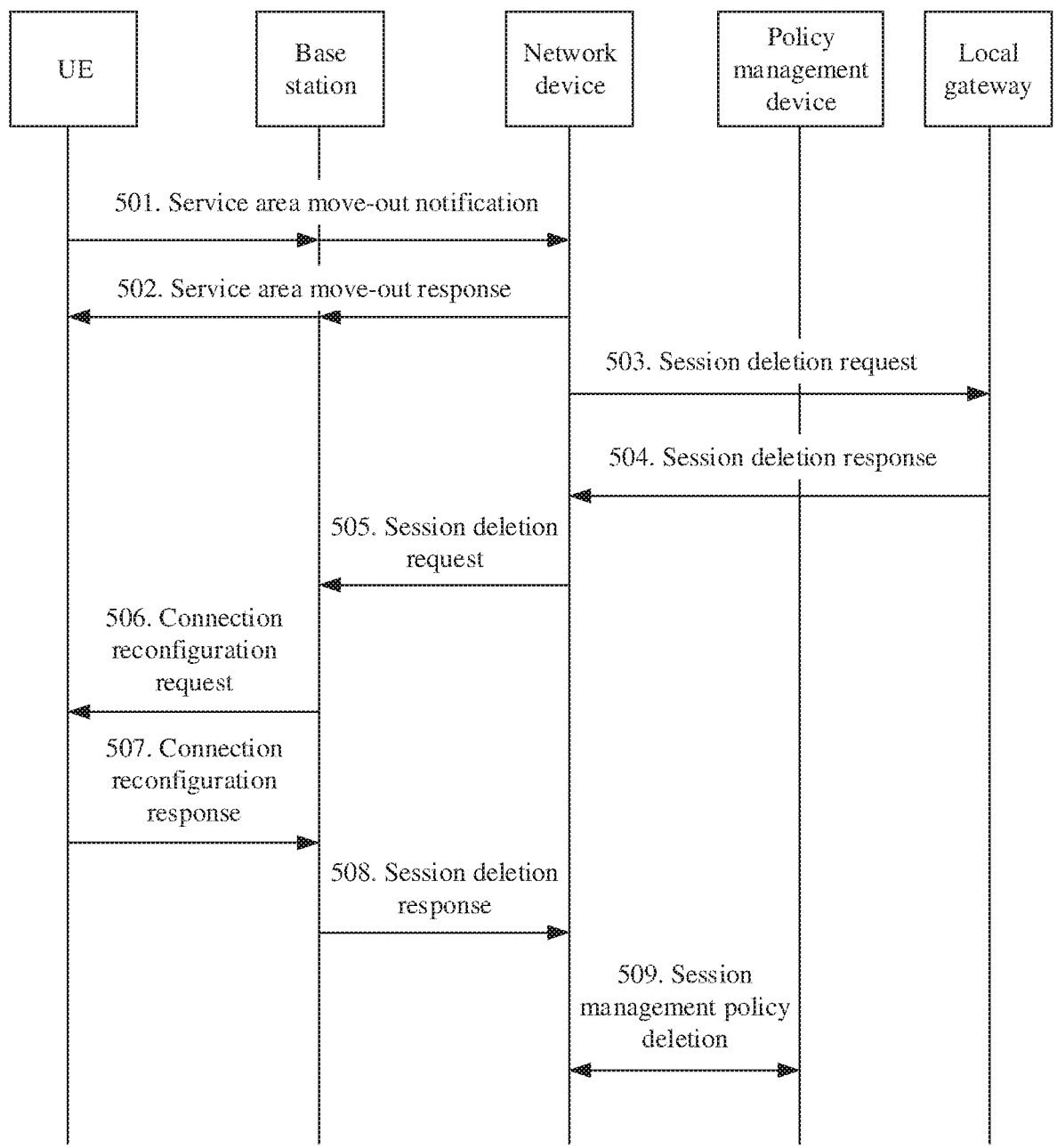
FIG. 5 is a schematic flowchart for a case in which user equipment leaves a local network according to an embodiment of the present invention.

After accessing the local network, if the user equipment leaves the service area, the user equipment may discover, by using a system broadcast message broadcast by a base station at a new location, that a new cell does not belong to the service area of the local network, and then the user equipment determines that the user equipment already leaves the service area. Therefore, the user equipment reports, to the network device, that the user equipment leaves the service area, and the network device deletes the session between the user equipment and the local gateway. A specific process is shown in FIG. 5, and includes the following steps:

501: The user equipment sends a service area leaving notification message to the network device, and the base station forwards the message, where the message includes the identifier of the service area that the user equipment moves out.

502: After receiving the notification message from the user equipment, the network device sends a service area leaving response message to the user equipment.

503: After learning that the user equipment leaves the service area, the network device sends a session deletion request message to the local gateway, to request to delete a session of the user equipment in the local network corresponding to the service area.

504: The local gateway returns a session deletion response message, indicating that the session in the local network is successfully deleted.

505: The network device sends a session deletion request message to the base station, where the message includes a session deletion instruction message sent to the user equipment.

506: The base station sends a wireless connection reconfiguration request to the user equipment, to delete a radio bearer between the base station and the user equipment, where the message includes the session deletion instruction message sent to the user equipment.

507: The user equipment returns a wireless connection reconfiguration response message to the base station, where the message carries a session deletion instruction response message that is returned by the user equipment to the network device.

508: The base station returns a session deletion response message to the network device, where the message carries the session deletion instruction response message that is returned by the user equipment to the network device.

509: The network device sends a session management policy deletion message, to delete a PDU-CAN session between the network device and the policy management device.

It should be noted that in a 5G network, a service-based architecture procedure is used, and a client-server communication mode is used for a signaling procedure. Correspondingly, the foregoing procedure is modified as follows:

Step 509a: The network device requests the policy management device to delete policy data of the user equipment by using an Npcf_SMPolicyControl_Delete operation. The policy management device returns an Npcf_SMPolicyControl_Delete operation response.

Figure 6:
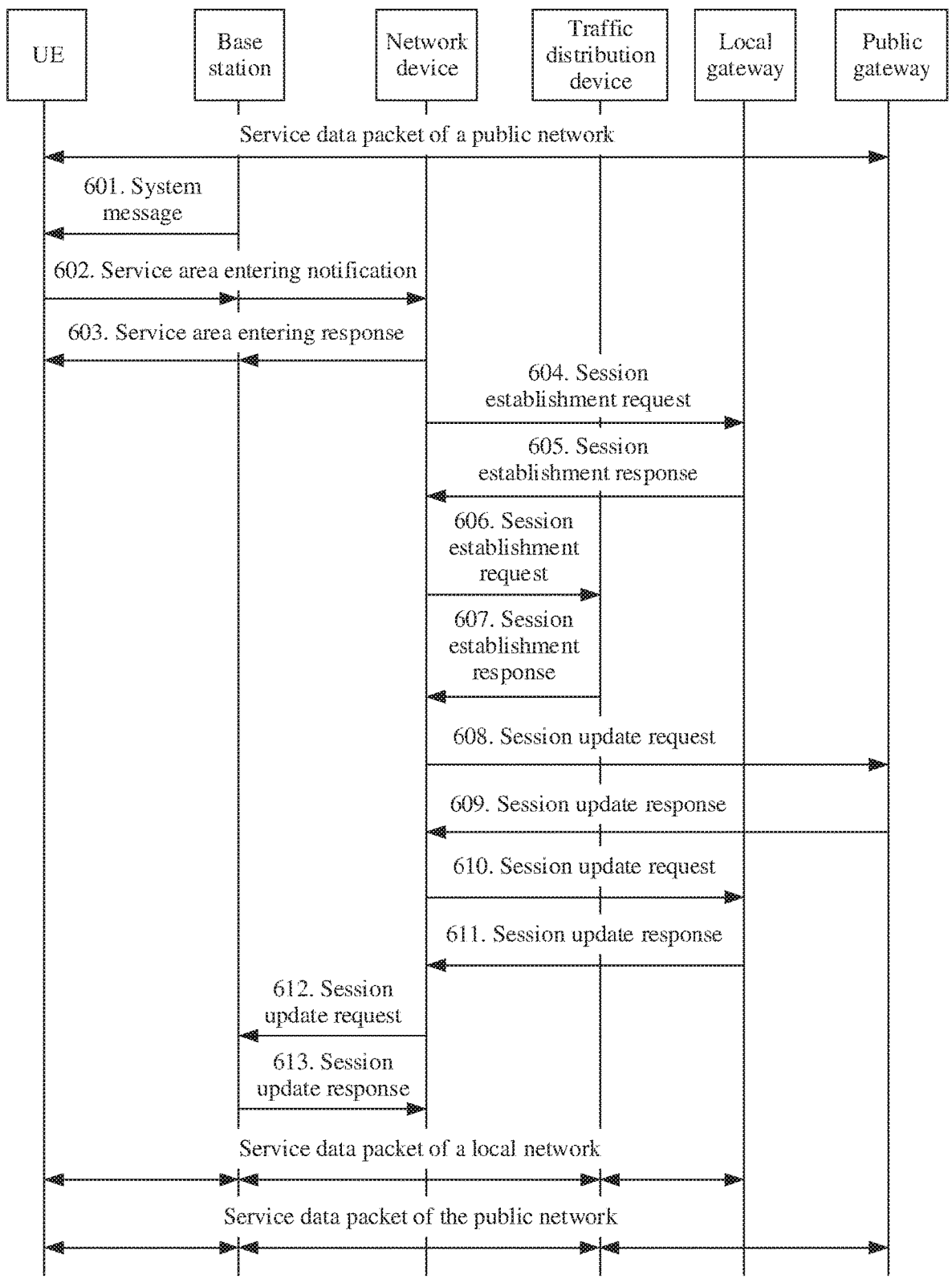
FIG. 6 is another schematic flowchart for a case in which user equipment accesses a local network according to an embodiment of the present invention.

An embodiment of the present invention further provides another method for connecting user equipment to a local network, which is applied to the system shown in FIG. 2. In this method, a traffic distribution device is used to distribute traffic when the user equipment accesses the local network to a local gateway, and distributes traffic generated when the user equipment accesses a public network to a public gateway. A specific process is shown in FIG. 6, and includes the following steps:

601: When moving to a service area, the user equipment receives a system message broadcast by a base station, where the system message includes a current cell identity and an identifier of the service area. After receiving the system message, the user equipment determines that the identifier of the service area corresponding to the cell that the user equipment currently enters is included in a list of identifiers of service areas that is delivered by a network device, and then initiates a procedure to notify the network device.

The user equipment is previously not in the service area, and initiates the procedure to notify the network device when moving and entering the service area. To be specific, the system message that is broadcast by the base station and previously received by the user equipment does not include any identifier of a service area, or an identifier of a service area included in the system message is not the identifier of the foregoing service area.

602: The user equipment sends a service area entering notification message to the network device, and the base station forwards the message, where the message includes the identifier of the service area that the user equipment currently enters.

603: After receiving the service area entering notification message sent by the user equipment, the network device obtains the identifier of the service area in the message and checks whether the user equipment is allowed to access the service area, and if the identifier of the service area is included in the list of identifiers of service areas that is delivered by the network device to the user equipment, the user equipment is allowed to access the service area.

After checking that the user equipment is allowed to access the service area, the network device sends a service area entering response message to the user equipment.

604: The user equipment currently has an established session, and after learning that the user equipment enters the service area, the network device determines to add, based on the established session, a local gateway corresponding to the service area, that is, a session anchor (PDU session anchor, PSA), and inserts a traffic distribution (Uplink Classifier, the UL CL) device, so that a service data packet of the user equipment in the local network is forwarded from the local gateway and a service data packet of the user equipment in a macro network is forwarded from a public gateway.

The network device may determine, according to a policy of the local network, whether to insert the traffic distribution device based on the existing session. The policy of the local network may be configured on the network device, or may be obtained from another node such as a policy management device or an operation and maintenance center.

The network device selects the local gateway based on the identifier of the service area, and sends a session establishment request message to the local gateway, where the session establishment request message is used to establish a session between the user equipment and the local gateway.

605: The local gateway returns a session establishment response message, indicating that the session is successfully established.

In step 604 or 605, the network device may specify, for the local gateway, service data packet forwarding information related to the session, where the service data packet forwarding information includes information such as an IP address of the local gateway and a tunnel endpoint identifier of the local gateway. Alternatively, the local gateway may allocate service data packet forwarding information related to the session.

606. The network device sends a session establishment request message to the traffic distribution device, where the session establishment request message is used to notify the traffic distribution device of a traffic distribution rule for an uplink service data packet. To be specific, a service data packet in the local network corresponding to the service area is forwarded by using the local gateway, and another service data packet is forwarded by using the public gateway. The session establishment request message carries the service data packet forwarding information of the local gateway, and a correspondence between service data packet forwarding information of the public gateway and a service filter, where the service filter includes information such as a 5-tuple: a source IP address, a destination IP address, a source port number, a destination port number, and a protocol number.

In addition, the foregoing message carries service data packet forwarding information of the base station, and the service data packet forwarding information is used to establish a channel for forwarding a downlink service data packet between the traffic distribution device and the base station.

607: The traffic distribution device returns a session establishment response message, indicating that the session is successfully established.

In step 606 or 607, the network device may specify, for the traffic distribution device, service data packet forwarding information related to the session, where the service data packet forwarding information includes information such as an IP address of the traffic distribution device and a tunnel endpoint identifier of the traffic distribution device. Alternatively, the traffic distribution device may allocate service data packet forwarding information related to the session.

608: The network device sends a session update request message to the public gateway, where the message carries the service data packet forwarding information of the traffic distribution device, and the service data packet forwarding information is used to establish a channel for forwarding a downlink service data packet between the public gateway and the traffic distribution device.

609: The public gateway returns a session update response message.

610: The network device sends a session update request message to the local gateway, where the message carries the service data packet forwarding information of the traffic distribution device, and the service data packet forwarding information is used to establish a channel for forwarding a downlink service data packet between the local gateway and the traffic distribution device.

611: The local gateway returns a session update response message.

612: The network device sends a session update request message to the base station, where the message carries the service data packet forwarding information of the traffic distribution device, and the service data packet forwarding information is used to establish a channel for forwarding an uplink service data packet between the base station and the traffic distribution device.

613: The base station returns a session update response message.

In the foregoing method, the network device adds the session anchor to the local network for the user equipment based on the existing session, and inserts the traffic distribution device, so that a service data packet generated when the user equipment accesses the local network can be distributed to the local gateway.

Figure 7:
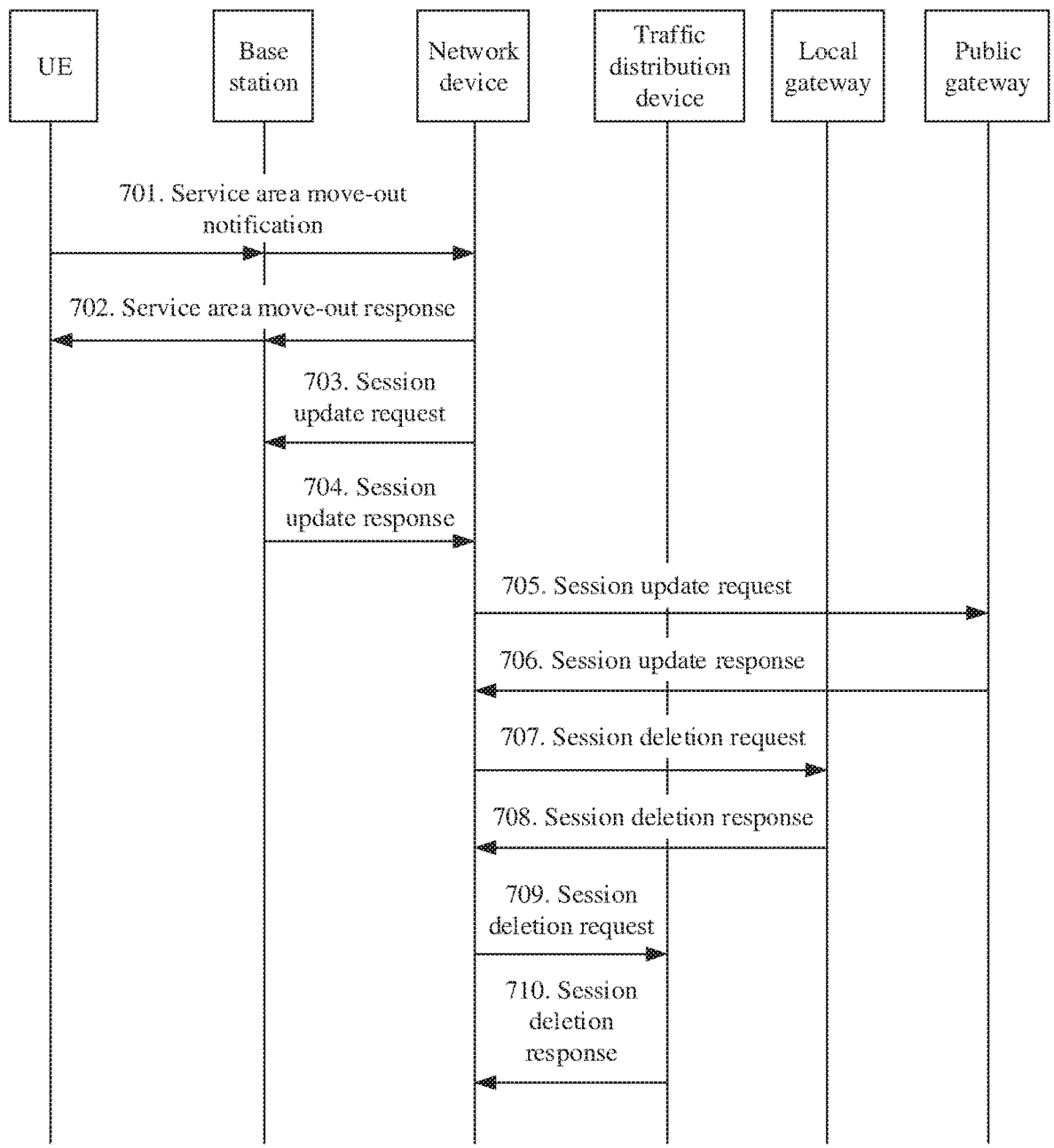
FIG. 7 is another schematic flowchart for a case in which user equipment leaves a local network according to an embodiment of the present invention.

Similarly, after accessing the local network, if the user equipment leaves the service area, the user equipment may discover, by using a system broadcast message broadcast by a base station at a new location, that a new cell does not belong to the service area of the local network, and then the user equipment determines that the user equipment already leaves the service area. Therefore, the user equipment reports, to the network device, that the user equipment leaves the service area, and the network device deletes the session between the user equipment and the local gateway. The network device performs an operation such as removal of the traffic distribution device. A specific process is shown in FIG. 7, and includes the following steps:

701: The user equipment sends a service area leaving notification message to the network device, and the base station forwards the message, where the message includes the identifier of the service area that the user equipment moves out.

702: After receiving the notification message from the user equipment, the network device sends a service area leaving response message to the user equipment.

703: After learning that the user equipment leaves the service area, the network device needs to delete the session anchor that is of the local gateway and that is added for the user equipment, and remove the traffic distribution device used for traffic distribution. The network device sends a session update request message to the base station, where the message carries the service data packet forwarding information of the public gateway, and the service data packet forwarding information is used to establish a channel for forwarding an uplink service data packet between the base station and the public gateway.

704: The base station returns a session update response message.

705: The network device sends a session update request message to the public gateway, where the message carries the service data packet forwarding information of the base station, and the service data packet forwarding information is used to establish a downlink channel that is between the base station and the public gateway and that is used for forwarding a downlink service data packet.

706: The public gateway returns a session update response message.

707: The network device sends a session deletion request message to the local gateway, where the session deletion request message is used to delete the session anchor of the local gateway.

708: The local gateway returns a session deletion response message.

709: The network device sends a session deletion request message to the traffic distribution device, where the session deletion request message is used to remove the traffic distribution device.

710: The traffic distribution device returns a session deletion response message.

Figure 8:
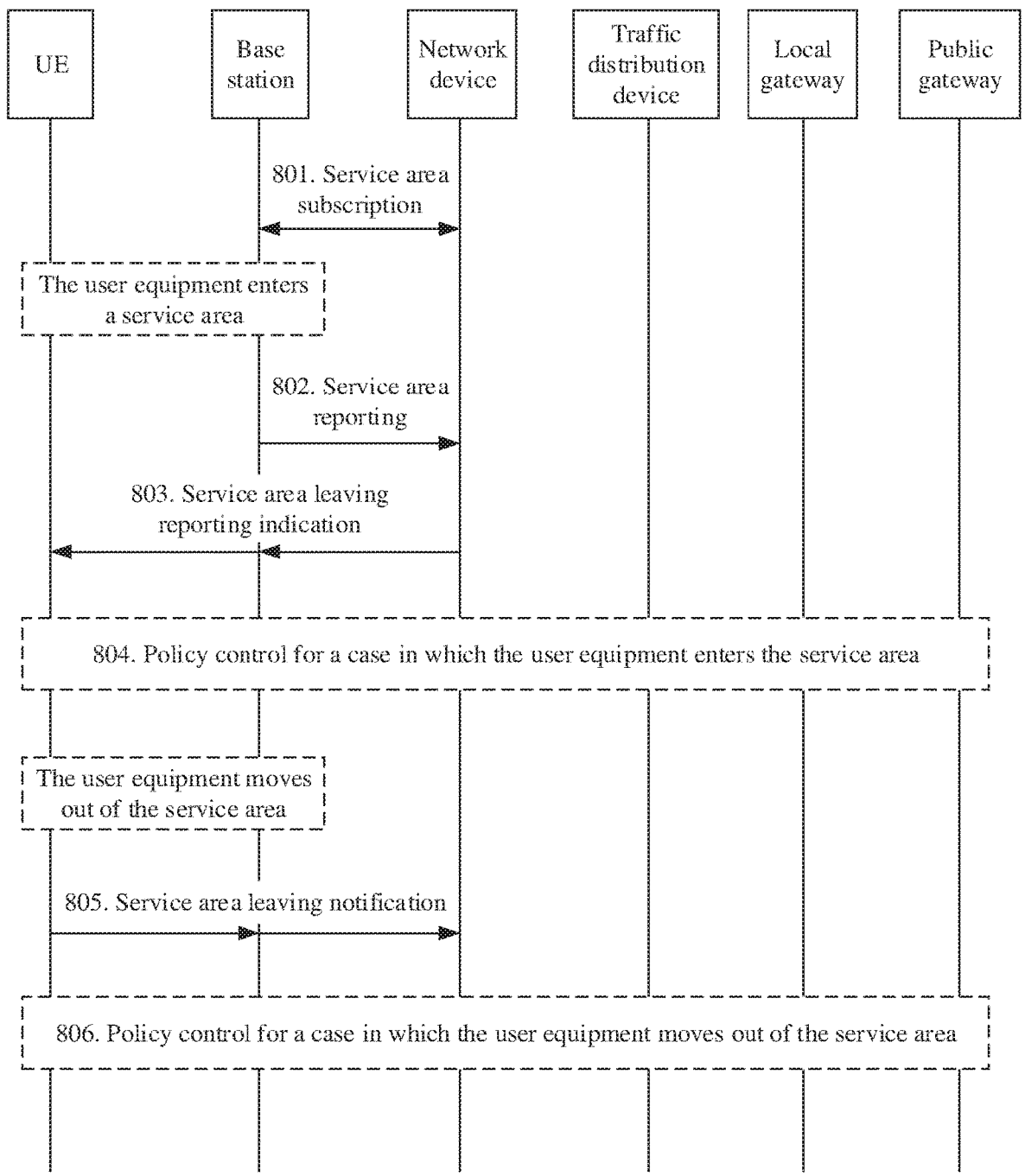
FIG. 8 is a schematic flowchart for a case in which user equipment accesses and leaves a local network according to an embodiment of the present invention.

An embodiment of the present invention further provides another method for connecting user equipment to a local network, which is applied to the systems shown in FIG. 1 and FIG. 2. In this method, the user equipment can access a local network of an enterprise, for example, a local network of a shopping mall or library, in a service area without subscribing to a local network service of the enterprise. Specifically, the method is shown in FIG. 8, and includes the following steps:

801: A network device sends a service area subscription message to a base station to notify the base station, and the base station notifies the network device after the user equipment enters a service area. The service area subscription message may also include a list of service areas, and the list of service areas indicates the base station to notify the network device after the user equipment enters these specific service areas.

The list of service areas may be a list of local networks allowing access of all user equipments that are locally configured by the network device.

The network device may store a correspondence between a base station and a service area. The service area subscription message sent by the network device to the base station includes identifiers of one or more service areas in which the base station is located. Alternatively, the network device may send service area subscription messages to all base stations within a coverage area of the network device, where the message carries the list of local networks allowing access of all user equipments that are locally configured by the network device.

The service area subscription message may be a message at a granularity of a device. To be specific, when each of the user equipments enters the service area, the base station notifies the network device.

The service area subscription message may alternatively be a message at a granularity of a user. To be specific, when some specific user equipments enter the service area, the base station notifies the network device. A service area allowing access of the specific user equipment belongs to at least one of the following: a list of service areas allowing access that is included in subscription data of the user equipment, a list of service areas allowing access of the specific user equipment that is included in policy data; or a list of service areas allowing access of the specific user equipment that is included in local configuration of the network device.

802: After the user equipment enters the service area, the base station in the service area sends a service area reporting message to the network device, where the message includes an identifier of the service area that the user equipment enters.

803. After receiving the message, the network device learns that the user equipment enters the service area, learns, according to a control policy of the local network, that the user equipment needs to be tracked when moving in the service area, and sends a service area leaving reporting indication message, where the service area leaving reporting indication message includes the identifier of the service area. The service area leaving reporting indication message is used to indicate that the user equipment needs to notify the network device when leaving the service area.

804: The network device performs policy control for a case in which the user equipment has entered the service area. For details, refer to the embodiments, corresponding to FIG. 4 and FIG. 6, in which the network device controls access of the user equipment to the local network. Details are not described again.

805: After use of the local network, if the user equipment leaves the service area, and a system message that is broadcast by the base station and received by the user equipment does not include the identifier of the service area, the user equipment learns that the user equipment leaves the service area, and then sends a service area leaving notification message to the network device, where the service area leaving notification message carries the identifier of the service area identifier. Correspondingly, when the user equipment is in an idle mode, the user equipment first needs to initiate a service request procedure to transition to a connected mode, and then sends the service area leaving notification message to the network device.

The service area leaving reporting indication message in step 803 and the service area leaving notification message in step 805 are named merely as examples, and specific names for the messages are not limited in this embodiment. Instead of a dedicated message, alternatively, it may be implemented by using a message shared with another function, for example, by using a message to which a service area leaving reporting indication information element or a service area leaving notification information element is added.

806: After learning that the user equipment leaves the service area, the network device performs policy control for a case in which the user equipment has moved out of the service area. For details, refer to the embodiments, corresponding to FIG. 5 and FIG. 7, in which the network device controls to delete a connection between the user equipment and the local network. Specific steps are not described again.

In an example embodiment of the present invention, policy control performed by the network device for a case in which the user equipment accesses or leaves the local network corresponding to the service area may further include various personalized services in the local network, for example, service restriction performed by the network device, display of an enterprise name on the user equipment, a welcome SMS message, customized service push, or differential charging. Examples are not listed one by one herein.

Figure 9:
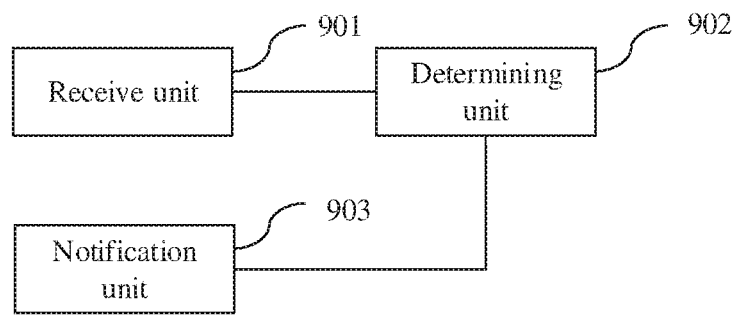
FIG. 9 is a schematic structural diagram of user equipment according to an embodiment of the present invention.

An embodiment of the present invention further provides a schematic structural diagram of user equipment. As shown in FIG. 9, the user equipment includes a receive unit 901, a determining unit 902, and a notification unit 903.

The receive unit is configured to receive a system message broadcast by a base station.

The determining unit is configured to determine, based on the system message, that a service area is changed.

The notification unit is configured to notify a network device that the service area is changed, so that the network device performs policy control for accessing or leaving a local network corresponding to the service area.

Further, these units implement related functions in the foregoing methods, and details are not described again.

In this embodiment, the user equipment is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the user equipment may be implemented by using a processor, a memory, and a communications interface.

Figure 10:
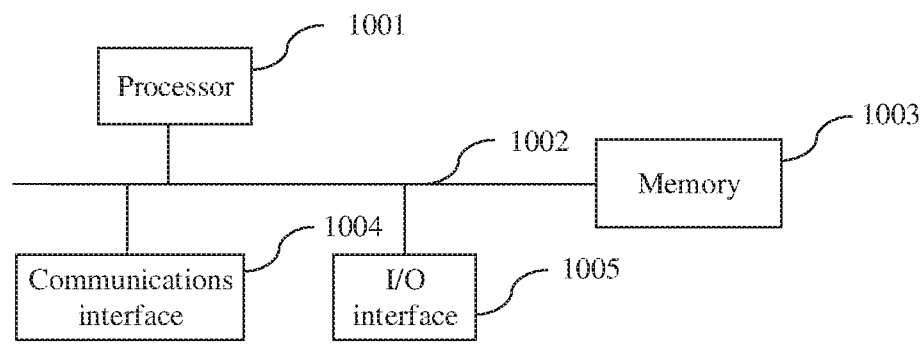
FIG. 10 is another schematic structural diagram of user equipment according to an embodiment of the present invention.

The user equipment in the embodiments of the present invention may further be implemented in a manner of a computer device (or a system) in FIG. 10. FIG. 10 is a schematic diagram of a computer device according to an embodiment of the present invention. The computer device includes at least one processor 1001, a communications bus 1002, a memory 1003, and at least one communications interface 1004, and may further include an I/O interface 1005.

The processor may be a universal central processing unit (CPU), a microprocessor, an application-specific integrated circuit (ASIC), or one or more integrated circuits configured to control execution of programs in the solutions of example embodiments of the present invention.

The communications bus may include a channel for transmitting information between the foregoing components. The communications interface is configured to communicate with another device or a communications network such as an Ethernet, a radio access network (RAN), or a wireless local area network (WLAN) by using any apparatus of a transceiver type.

The memory may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, and the like), a magnetic disk storage medium or another magnetic storage device, or any other medium capable of carrying or storing expected program code in a form of instructions or data structures and capable of being accessed by a computer. This is not limited. The memory may exist independently, and is connected to the processor by using the bus. Alternatively, the memory may be integrated with the processor.

The memory is configured to store application program code used to execute the solutions of the present invention, and the execution is controlled by the processor. The processor is configured to execute the application program code stored in the memory.

In specific implementation, the processor may include one or more CPUs. and each CPU may be a single-core processor (single-core) or a multi-core (multi-Core) processor. The processor herein may refer to one or more devices, circuits, and/or processing cores configured to process data (for example, a computer program instruction).

In specific implementation, in an embodiment, the computer device may further include an input/output (I/O) interface. For example, the output device may be a liquid crystal display (LCD), a light emitting diode (LED) display device, a cathode ray tube (CRT) display device, a projector (projector), or the like. An input device may be a mouse, a keyboard, a touchscreen device, or a sensing device.

The computer device may be a general-purpose computer device or a dedicated computer device. In specific implementation, the computer device may be a desktop computer, a portable computer, a network server, a palmtop computer (Personal Digital Assistant. PDA), a mobile phone, a tablet computer, a wireless terminal device, a communications device, an embedded device, or a device with a structure similar to that in FIG. 10. A type of the computer device is not limited in this embodiment of the present invention.

The user equipment in FIG. 1 or FIG. 2 may be the device shown in FIG. 10, and the memory stores one or more software modules. The user equipment may implement the software module by using the processor and the program code in the memory, to implement the foregoing methods.

An embodiment of the present invention further provides a computer storage medium, configured to store a computer software instruction used by the device shown in FIG. 9 or FIG. 10. The computer software instruction includes a program designed to perform the foregoing method embodiments. The foregoing methods can be implemented by executing the stored program.

Figure 11:
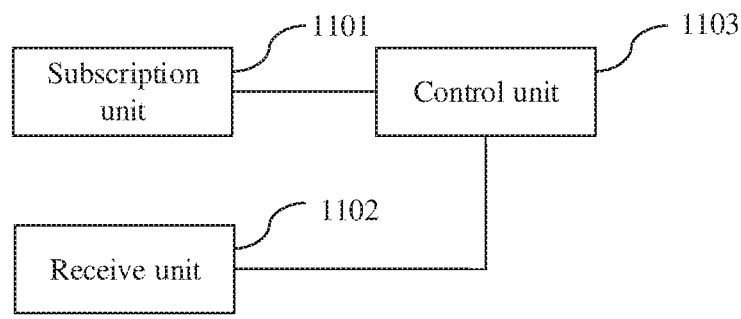
FIG. 11 is a schematic structural diagram of a network device according to an embodiment of the present invention.

An embodiment of the present invention further provides a schematic structural diagram of a network device. As shown in FIG. 11, the network device includes a subscription unit 1101, a receive unit 1102, and a control unit 1103.

The subscription unit is configured to subscribe to service area change information of user equipment, where the service area change information of the user equipment indicates that the user equipment enters or leaves a service area of a local network.

The receive unit is configured to receive the service area change information of the user equipment.

The control unit is configured to perform, based on the received service area change information, policy control for a case in which the user equipment accesses or leaves the local network.

Further, these units implement related functions in the foregoing methods, and details are not described again.

In this embodiment, the network device is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the network device may be implemented by using a processor, a memory, and a communications interface.

Figure 12:
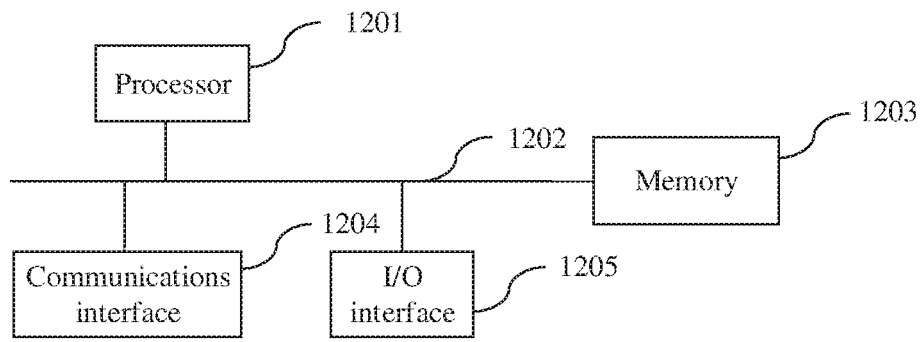
FIG. 12 is another schematic structural diagram of a network device according to an embodiment of the present invention.

The network device in the embodiments of the present invention may further be implemented in a manner of a computer device (or a system) in FIG. 12. FIG. 12 is a schematic diagram of a computer device according to an embodiment of the present invention. The computer device includes at least one processor 1201, a communications bus 1202, a memory 1203, and at least one communications interface 1204, and may further include an I/O interface 1205.

The processor may be a universal central processing unit (CPU), a microprocessor, an application-specific integrated circuit (ASIC), or one or more integrated circuits configured to control execution of programs in the solutions of example embodiments of the present invention.

The communications bus may include a channel for transmitting information between the foregoing components. The communications interface is configured to communicate with another device or a communications network such as an Ethernet, a radio access network (RAN), or a wireless local area network (WLAN) by using any apparatus of a transceiver type.

The memory may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, and the like), a magnetic disk storage medium or another magnetic storage device, or any other medium capable of carrying or storing expected program code in a form of instructions or data structures and capable of being accessed by a computer. This is not limited. The memory may exist independently, and is connected to the processor by using the bus. Alternatively, the memory may be integrated with the processor.

The memory is configured to store application program code used to execute the solutions of the present invention, and the execution is controlled by the processor. The processor is configured to execute the application program code stored in the memory.

In specific implementation, the processor may include one or more CPUs, and each CPU may be a single-core processor (single-core) or a multi-core (multi-Core) processor. The processor herein may refer to one or more devices, circuits, and/or processing cores configured to process data (for example, a computer program instruction).

In specific implementation, in an embodiment, the computer device may further include an input/output (I/O) interface. For example, the output device may be a liquid crystal display (LCD), a light emitting diode (LED) display device, a cathode ray tube (CRT) display device, a projector (projector), or the like. An input device may be a mouse, a keyboard, a touchscreen device, or a sensing device.

The computer device may be a general-purpose computer device or a dedicated computer device. In specific implementation, the computer device may be a desktop computer, a portable computer, a network server, a palmtop computer (Personal Digital Assistant, PDA), a mobile phone, a tablet computer, a wireless terminal device, a communications device, an embedded device, or a device with a structure similar to that in FIG. 12. A type of the computer device is not limited in this embodiment of the present invention.

The network device in FIG. 1 or FIG. 2 may be the device shown in FIG. 12, and the memory stores one or more software modules. The network device may implement the software module by using the processor and the program code in the memory, to implement the foregoing methods.

An embodiment of the present invention further provides a computer storage medium, configured to store a computer software instruction used by the device shown in FIG. 11 or FIG. 12. The computer software instruction includes a program designed to perform the foregoing method embodiments. The foregoing methods can be implemented by executing the stored program.

Figure 13:
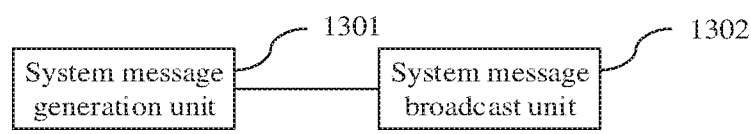
FIG. 13 is a schematic structural diagram of a base station according to an embodiment of the present invention.

An embodiment of the present invention further provides a schematic structural diagram of a base station. As shown in FIG. 13, the base station includes a system message generation unit 1301 and a system message broadcast unit 1302.

The system message generation unit is configured to generate a system message, where the system message includes an identifier of a service area.

The system message broadcast unit is configured to broadcast the system message to user equipment, to notify the user equipment of a service area in which the user equipment is currently located.

The identifier of the service area corresponds to a service area of a local network, and the service area includes one or more location areas.

Figure 14:
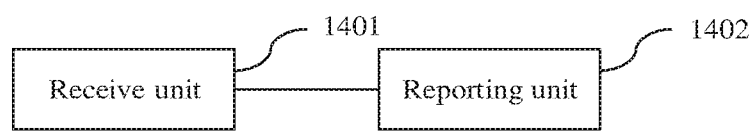
FIG. 14 is another schematic structural diagram of a base station according to an embodiment of the present invention.

An embodiment of the present invention further provides a schematic structural diagram of a base station. As shown in FIG. 14, the base station includes a receive unit 1401 and a reporting unit 1402.

The receive unit is configured to receive a service area subscription message sent by a network device, where the service area subscription message includes a list of identifiers of service areas, and the list of identifiers of service areas includes identifiers of one or more service areas and indicates the base station to send a service area reporting message to the network device after user equipment enters the service area.

The reporting unit is configured to send the service area reporting message to the network device after the user equipment enters the service area.

Further, these units implement related functions in the foregoing methods, and details are not described again.

In this embodiment, the base station is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the base station may be implemented by using a processor, a memory, and a communications interface.

Figure 15:
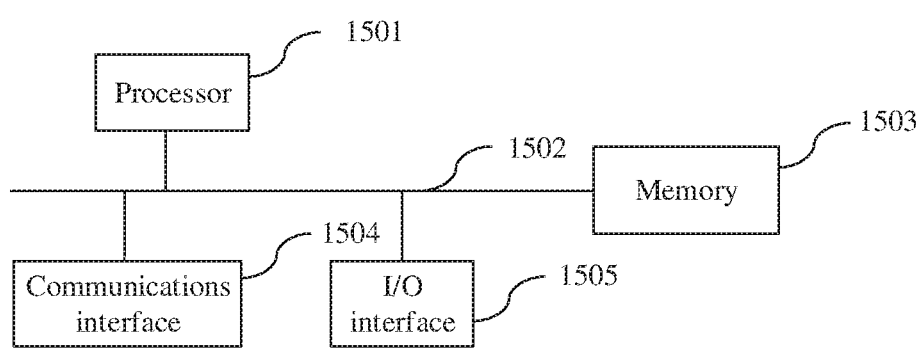
FIG. 15 is still another schematic structural diagram of a base station according to an embodiment of the present invention.

The base station in the embodiments of the present invention may further be implemented in a manner of a computer device (or a system) in FIG. 15. FIG. 15 is a schematic diagram of a computer device according to an embodiment of the present invention. The computer device includes at least one processor 1501, a communications bus 1502, a memory 1503, and at least one communications interface 1504, and may further include an I/O interface 1505.

The processor may be a universal central processing unit (CPU), a microprocessor, an application-specific integrated circuit (ASIC), or one or more integrated circuits configured to control execution of programs in solutions of example embodiments of the present invention.

The communications bus may include a channel for transmitting information between the foregoing components. The communications interface is configured to communicate with another device or a communications network such as an Ethernet, a radio access network (RAN), or a wireless local area network (WLAN) by using any apparatus of a transceiver type.

The memory may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, and the like), a magnetic disk storage medium or another magnetic storage device, or any other medium capable of carrying or storing expected program code in a form of instructions or data structures and capable of being accessed by a computer. This is not limited. The memory may exist independently, and is connected to the processor by using the bus. Alternatively, the memory may be integrated with the processor.

The memory is configured to store application program code used to execute the solutions of the present invention, and the execution is controlled by the processor. The processor is configured to execute the application program code stored in the memory.

In specific implementation, the processor may include one or more CPUs, and each CPU may be a single-core processor (single-core) or a multi-core (multi-Core) processor. The processor herein may refer to one or more devices, circuits, and/or processing cores configured to process data (for example, a computer program instruction).

In specific implementation, in an embodiment, the computer device may further include an input/output (I/O) interface. For example, the output device may be a liquid crystal display (LCD), a light emitting diode (LED) display device, a cathode ray tube (CRT) display device, a projector (projector), or the like. An input device may be a mouse, a keyboard, a touchscreen device, or a sensing device.

The computer device may be a general-purpose computer device or a dedicated computer device. In specific implementation, the computer device may be a desktop computer, a portable computer, a network server, a palmtop computer (PDA), a mobile phone, a tablet computer, a wireless terminal device, a communications device, an embedded device, or a device with a structure similar to that in FIG. 15. A type of the computer device is not limited in this embodiment of the present invention.

The base station in FIG. 1 or FIG. 2 may be the device shown in FIG. 15, and the memory stores one or more software modules. The base station may implement the software module by using the processor and the program code in the memory, to implement the foregoing methods.

An embodiment of the present invention further provides a computer storage medium, configured to store a computer software instruction used by the device shown in FIG. 13, FIG. 14 or FIG. 15. The computer software instruction includes a program designed to perform the foregoing method embodiments. The foregoing methods can be implemented by executing the stored program.

Although the present invention is described with reference to the embodiments, in a process of implementing the present invention that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of a plurality. A single processor or another unit may implement one or more functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, example embodiments of the present invention may use a form of hardware only embodiments, software only embodiments, or embodiments with a combination of software and hardware. Moreover, example embodiments of the present invention may use a form of a computer program product that is implemented on one or more computer-usable storage media (including but not limited to a magnetic disk memory, a CD-ROM, an optical memory, and the like) that include computer-usable program code. A computer program is stored/distributed in a proper medium and is provided as or used as a part of hardware together with other hardware, or may be distributed in another form, for example, through the internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may also be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and embodiments thereof, it is obvious that various modifications and combinations may be made thereto. Correspondingly, the specification and accompanying drawings are merely exemplary description of the present invention defined by the accompanying claims, and is considered as any of or all modifications, variations, combinations or equivalents that cover the scope of the present invention. Obviously, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A method for accessing a local network, comprising:
receiving, by user equipment, a system message broadcast by a base station;
determining, based on the system message, that a service area is changed; and
notifying a network device that the service area is changed, so that the network device performs policy control for accessing or leaving the local network corresponding to the service area;
wherein before the receiving of the system message broadcast by the base station, the method further comprises: receiving, by the user equipment, a list of identifiers of service areas that is sent by the network device, wherein the list of identifiers of service areas comprises identifiers of one or more service areas and indicates the user equipment to send a notification message to the network device after the user equipment enters or leaves the service area; or
wherein before the receiving of the system message broadcast by the base station, the method further comprises: receiving, by the user equipment, a service area leaving reporting indication message sent by the network device, wherein the service area leaving reporting indication message comprises the identifier of the service area and indicates the user equipment to send the notification message to the network device after the user equipment leaves the service area.

2. The method according to claim 1,
(i) wherein the determining, based on the system message, that the service area is changed comprises: determining, by the user equipment based on the received system message comprising an identifier of the service area, that the user equipment enters the service area; and the notifying of the network device that the service area is changed comprises: sending, by the user equipment, a service area entering notification message to the network device, wherein the service area entering notification message comprises the identifier of the service area that the user equipment enters; or
(ii) wherein the determining, based on the system message, that the service area is changed comprises: determining, by the user equipment based on the received system message not comprising an identifier of the service area, that the user equipment leaves the service area; and the notifying of the network device that the service area is changed comprises: sending, by the user equipment, a service area leaving notification message to the network device, wherein the service area leaving notification message comprises the identifier of the service area that the user equipment leaves.

3. The method according to claim 1, wherein the identifier of the service area corresponds to a service area of the local network, and the service area comprises one or more location areas.

4. A method for accessing a local network, comprising:
subscribing, by a network device, to service area change information of user equipment, wherein the service area change information of the user equipment indicates that the user equipment enters or leaves a service area of the local network;
receiving the service area change information of the user equipment; and performing, based on the received service area change information, policy control for a case in which the user equipment accesses or leaves the local network;

wherein the subscribing, by the network device, to the service area change information of the user equipment comprises;

sending, by the network device, a message comprising a list of identifiers of service areas, wherein the list of identifiers of service areas comprises identifiers of one or more service areas and indicates that another message be sent to the network device after the user equipment enters or leaves the service area.

5. The method according to claim 4, wherein the message comprising the list of identifiers of service areas is sent by the network device to the user equipment, wherein the another message is a notification message to be received by the network device from the user equipment after the user equipment enters or leaves the service area, wherein the list of service areas is at least one of the following: a list of service areas allowing access of the user equipment that is comprised in subscription data of the user equipment, a list of service areas allowing access of the user equipment that is comprised in policy data, or a list of service areas allowing access of the user equipment that is comprised in local configuration of the network device.

6. The method according to claim 4, wherein the message comprising the list of identifiers of service areas is sent, by the network device to a base station, wherein the another message is a service area reporting message to be received by the network device from the base station after the user equipment enters the service area, wherein the list of service areas is a list of local networks allowing access of the user equipment that is locally configured by the network device.

7. The method according to claim 6, wherein the message sent to the base station is a service area subscription message which further comprises a user equipment identity, and the user equipment identity indicates the base station to send the service area reporting message to the network device after the user equipment enters the service area; and the list of service areas is at least one of the following: a list of service areas allowing access of the user equipment that is comprised in subscription data of the user equipment, a list of service areas allowing access of the user equipment that is comprised in policy data, or a list of service areas allowing access of the user equipment that is comprised in local configuration of the network device.

8. The method according to claim 6, further comprising:

receiving, by the network device, the service area reporting message sent by the base station, wherein the message comprises an identifier of the service area that the user equipment enters; and sending, by the network device, a service area leaving reporting indication message to the user equipment, wherein the service area leaving reporting indication message comprises the identifier of the service area and indicates the user equipment to send a notification message to the network device after the user equipment leaves the service area.

9. The method according to claim 4, (i) wherein the receiving the service area change information of the user equipment is receiving a service area entering notification message indicating that the user equipment enters the service area, and the service area entering notification message comprises the identifier of the service area; and the performing of the policy control for a case in which the user equipment accesses the local network comprises: establishing a session between the user equipment and a local gateway corresponding to the identifier of the service area; or (ii) wherein the receiving the service area change information of the user equipment is receiving a service area entering notification message indicating that the user equipment enters the service area, and the service area entering notification message comprises the identifier of the service area; and the performing of the policy control for a case in which the user equipment accesses the local network comprises: establishing a session from the user equipment through a traffic distribution device to a local gateway corresponding to the identifier of the service area, and establishing a session from the user equipment through the traffic distribution device to a public gateway; or (iii) wherein the receiving the service area change information of the user equipment is receiving a service area leaving notification message indicating that the user equipment leaves the service area; and the performing policy control for a case in which the user equipment leaves the local network comprises: deleting, by the network device, the session between the user equipment and the local gateway.

10. The method according to claim 4, wherein the identifier of the service area corresponds to a service area of the local network, and the service area comprises one or more location areas.

11. A service area notification method, comprising:

receiving, by a base station, a service area subscription message sent by a network device, wherein the service area subscription message comprises a list of identifiers of service areas, wherein the list of identifiers of service areas comprises identifiers of one or more service areas and indicates the base station to send a service area reporting message to the network device after user equipment enters the service area; and sending, by the base station, the service area reporting message to the network device after the user equipment enters the service area.

12. User equipment, comprising a receiver, a processor, and a transmitter, wherein the receiver is configured to receive a system message broadcast by a base station;

the processor is configured to determine, based on the system message, that a service area is changed; and the transmitter is configured to notify a network device that the service area is changed, so that the network device performs policy control for accessing or leaving a local network corresponding to the service area;

wherein the receiver is further configured to, before the receiver receives the system message broadcast by the base station, receive a list of identifiers of service areas that is sent by the network device, wherein the list of identifiers of service areas comprises identifiers of one or more service areas and indicates the user equipment to sent a notification message to the network device after the user equipment enters or leaves the service area; or wherein the receiver is further configured to, before the receiver receives the system message broadcast by the base station, receive a service area leaving reporting indication message sent by the network device, wherein the service area leaving reporting indication message comprises the identifier of the service area and indicates the user equipment to send the notification message to the network device after the user equipment leaves the service area.

13. The user equipment according to claim 12,
(i) wherein so that the processor determines, based on the system message, that the service area is changed, the processor is further configured to determine, based on the received system message comprising an identifier of the service area, that the user equipment enters the service area; and so that the transmitter notifies the network device that the service area is changed, the transmitter is further configured to send a service area entering notification message to the network device, wherein the service area entering notification message comprises the identifier of the service area that the user equipment enters; or
(ii) wherein so that the processor determines, based on the system message, that the service area is changed, the processor is further configured to determine, based on the received system message not comprising an identifier of the service area, that the user equipment leaves the service area; and so that the transmitter notifies the network device that the service area is changed, the transmitter is further configured to send a service area leaving notification message to the network device, wherein the service area leaving notification message comprises the identifier of the service area that the user equipment leaves.

14. The user equipment according to claim 12, wherein the identifier of the service area corresponds to a service area of the local network, and the service area comprises one or more location areas.

15. A network device, comprising a transmitter, a receiver, and a processor, wherein
the transmitter is configured to subscribe to service area change information of user equipment, wherein the service area change information of the user equipment indicates that the user equipment enters or leaves a service area of a local network;
the receiver is configured to receive the service area change information of the user equipment; and
the processor is configured to perform, based on the received service area change information, policy control for a case in which the user equipment accesses or leaves the local network;
wherein so that the transmitter subscribes to the service area change information of the user equipment, the transmitter is further configured to:
send a message comprising list of identifiers of service areas, wherein the list of identifiers of service areas comprises identifiers of one or more service areas and indicates that a message be sent to the network device after the user equipment enters or leaves the service area.

16. The network device according to claim 15, wherein
the message comprising the list of identifiers of service areas is sent to the user equipment, wherein the another message is a notification message to be received by the network device from the user equipment after the user equipment enters or leaves the service area, wherein
the list of service areas is at least one of the following: a list of service areas allowing access of the user equipment that is comprised in subscription data of the user equipment, a list of service areas allowing access of the user equipment that is comprised in policy data, or a list of service areas allowing access of the user equipment that is comprised in local configuration of the network device.

17. The network device according to claim 15, wherein
the message comprising the list of identifiers of service areas is sent to a base station, wherein the another message is a service area reporting message to be received by the network device from the base station after the user equipment enters the service area, wherein
the list of service areas is a list of local networks allowing access of the user equipment that is locally configured by the network device.

18. The network device according to claim 17, wherein the message sent to the base station is a service area subscription message which further comprises a user equipment identity, and the user equipment identity indicates the base station to send the service area reporting message to the network device after the user equipment enters the service area; and
the list of service areas is at least one of the following: a list of service areas allowing access of the user equipment that is comprised in subscription data of the user equipment, a list of service areas allowing access of the user equipment that is comprised in policy data, or a list of service areas allowing access of the user equipment that is comprised in local configuration of the network device.

19. The network device according to claim 17, wherein:
the receiver is further configured to receive the service area reporting message sent by the base station, wherein the message comprises an identifier of the service area that the user equipment enters; and
the transmitter is further configured to send a service area leaving reporting indication message to the user equipment, wherein the service area leaving reporting indication message comprises the identifier of the service area and indicates the user equipment to send a notification message to the network device after the user equipment leaves the service area.

20. The network device according to claim 15,
(i) wherein so that the receiver receives the service area change information of the user equipment, the receiver is further configured to receive a service area entering notification message indicating that the user equipment enters the service area, and the service area entering notification message comprises an identifier of the service area; and so that the processor performs the policy control for the case in which the user equipment accesses the local network, the processor is further configured to establish a session between the user equipment and a local gateway corresponding to the identifier of the service area; or
(ii) wherein so that the receiver receives the service area change information of the user equipment, the receiver is further configured to receive a service area entering notification message indicating that the user equipment enters the service area, and the service area entering notification message comprises an identifier of the service area; and so that the processor performs the policy control for the case in which the user equipment accesses the local network, the processor is further configured to establish a session from the user equipment through a traffic distribution device to a local gateway corresponding to the identifier of the service area, and establishing a session from the user equipment to a public gateway by using the traffic distribution device; or (iii) wherein so that the receiver receives the service area change information of the user equipment, the receiver is further configured to receive a service area leaving notification message indicating that the user equipment leaves the service area; and so that the processor performs the policy control for the case in which the user equipment leaves the local network, the processor is further configured to delete the session between the user equipment and the local gateway.

21. The network device according to claim 15, wherein the identifier of the service area corresponds to a service area of the local network, and the service area comprises one or more location areas.

22. A base station device, comprising a receiver and a transmitter, wherein the receiver is configured to receive a service area subscription message sent by a network device, wherein the service area subscription message comprises a list of identifiers of service areas, wherein the list of identifiers of the service areas comprises identifiers of one or more service areas and indicates a base station to send a service area reporting message to the network device after user equipment enters the service area; and the transmitter is configured to send the service area reporting message to the network device after the user equipment enters the service area.

* * * * *